(12) United States Patent
Poornachandran et al.

(10) Patent No.: US 9,721,093 B2
(45) Date of Patent: Aug. 1, 2017

(54) ENHANCED SECURITY OF POWER MANAGEMENT COMMUNICATIONS AND PROTECTION FROM SIDE CHANNEL ATTACKS

(71) Applicant: Intel Corporation, Santa Clara, CA (US)

(72) Inventors: Rajesh Poornachandran, Portland, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 14/740,639

(22) Filed: Jun. 16, 2015

(65) Prior Publication Data

US 2016/0371487 A1    Dec. 22, 2016

(51) Int. Cl.
*G06F 21/55*    (2013.01)
*G06F 21/57*    (2013.01)

(52) U.S. Cl.
CPC .......... *G06F 21/554* (2013.01); *G06F 21/575* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 6,566,858 B1 * | 5/2003 | Silverbrook | H04L 9/003 361/100 |
| 6,745,331 B1 * | 6/2004 | Silverbrook | G06F 21/31 347/10 |
| 7,249,108 B1 * | 7/2007 | Walmsley | B41J 2/17546 348/E5.024 |
| 8,301,905 B2 * | 10/2012 | Fronte | G06F 21/72 380/1 |
| 9,021,585 B1 * | 4/2015 | Paczkowski | G06F 21/577 455/550.1 |
| 2009/0094702 A1 | 4/2009 | Yang et al. | |

(Continued)

FOREIGN PATENT DOCUMENTS

WO    2015032571 A1    3/2015

OTHER PUBLICATIONS

Intel, "Quark SoC X1000 Core: Hardware Reference Manual", Oct. 2013, 143 pages.

(Continued)

*Primary Examiner* — Michael R Vaughan
*Assistant Examiner* — Richard A McCoy
(74) *Attorney, Agent, or Firm* — Jordan IP Law, LLC (57) ABSTRACT

Systems, apparatuses and methods may provide for detecting a request to access a power management register and conducting, via a power management security interface, a runtime credential exchange with a source of the request. Additionally, the request may be denied if the runtime credential exchange is unsuccessful. In one example, a plug event is detected, via a dedicated side channel, with respect to a debug port. A noise analysis may be conducted of one or more power rails in response to the plug event, wherein policy based counter noise may be generated on at least one of the one or more power rails at runtime if the noise analysis identifies a potential security attack.

20 Claims, 5 Drawing Sheets

(56) References Cited

U.S. PATENT DOCUMENTS

| | | | |
|---|---|---|---|
| 2009/0228698 A1* | 9/2009 | Shirlen | G06F 21/55 713/150 |
| 2009/0228981 A1* | 9/2009 | Shirlen | G06F 21/55 726/23 |
| 2010/0241864 A1 | 9/2010 | Kelley et al. | |
| 2012/0216001 A1* | 8/2012 | Ramly | G06F 21/87 711/163 |
| 2014/0013406 A1 | 1/2014 | Tremlet | |
| 2014/0089682 A1 | 3/2014 | Gulati et al. | |

OTHER PUBLICATIONS

Wikipedia, "Joint Test Action Group", wikipedia.org, retrieved on Mar. 30, 2015, 17 pages.
Wikipedia, "Power Management Integrated Circuit", wikipedia.org, retrieved on Mar. 30, 2015, 2 pages.
Wikipedia, "Power Management Unit", wikipedia.org, retrieved on Mar. 30, 2015, 2 pages.
International Search Report and Written Opinion for International Patent Application No. PCT/US2016/029103, mailed Jul. 27, 2016, 14 pages.

* cited by examiner

ENHANCED SECURITY OF POWER MANAGEMENT COMMUNICATIONS AND PROTECTION FROM SIDE CHANNEL ATTACKS

TECHNICAL FIELD

Embodiments generally relate to data security. More particularly, embodiments relate to enhanced security of power management communications and protection from side channel attacks.

BACKGROUND

System on chip (SoC) computing architectures may integrate a variety of circuit blocks (e.g., intellectual property/IP blocks) into a common silicon package, wherein different circuit blocks may perform different functions such as, for example, particular types of encryption processing. The circuit blocks, which may be connected to one or more power rails on the silicon package, may be independently placed in various power states in order to improve efficiency and/or reduce power consumption. Attackers of the computing system may attempt to use power management information to determine which circuit blocks are active at a given moment in time. For example, malware may attempt to access power management registers that store information regarding circuit block power states in an effort to identify the type of encryption processing being used. Additionally, physical access to the system through Joint Test Access Group (JTAG) debug ports may enable attackers to monitor the power rails and determine which circuit blocks (and underlying functions) are active.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
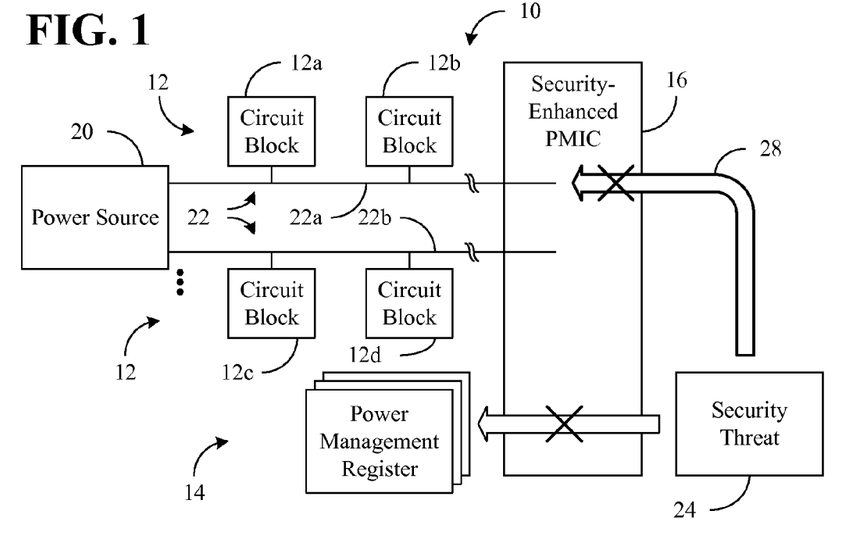
FIG. 1 is a block diagram of an example of a security threat solution according to an embodiment.

Turning now to FIG. 1, a security threat solution for a computing system such as a system on chip (SoC) 10 is shown. The SoC 10 may generally include a plurality of circuit blocks 12 (12a-12d), one or more power management registers 14 and a security-enhanced power management integrated circuit (PMIC) 16, wherein the circuit blocks 12 may be configured to perform various functions such as, for example, different types of encryption processing, communications, calculations, and so forth. For example, a first circuit block 12a may be configured to perform a first type of encryption/decryption on data processed by the SoC 10, a second circuit block 12b may be configured to perform a second type of encryption/decryption, a third circuit block 12c may be configured to perform a third type of encryption/decryption, etc. In the illustrated example, the circuit blocks 12 receive power from a power source 20 (e.g., battery, voltage regulator, adapter) via power rails 22 (22a, 22b).

As will be discussed in greater detail, the PMIC 16 may prevent various power management related attacks from a security threat 24 (e.g., attacker/intruder, malware). More particularly, the PMIC 16 may prevent/block one or more attempts 26 by the security threat 24 to access the power management registers 14 if, for example, the security threat 24 does not present appropriate credentials to access the power management registers 14. In one example, the PMIC 16 prevents/blocks the attempts 26 by using a power management security interface (e.g., architectural enclave, not shown) to establish a secure communication path between a host processor (not shown) and the power management registers 14. Additionally, the PMIC 16 may prevent/block one or more attempts 28 by the security threat 24 to monitor the power rails 22 (e.g., wire-level probing) during operation of the SoC 10. In one example, the PMIC 16 prevents/blocks the attempts 28 by using a side channel (e.g., out-of-band channel, not shown) to monitor a debug port of the system. Accordingly, the illustrated solution enhances security by preventing the security threat 24 from maliciously determining which circuit blocks 12 are active at any given moment in time. As a result, attackers may be unable to identify, for example, the type of encryption, communication and/or calculations being used during operation of the SoC 10.

Figure 2:
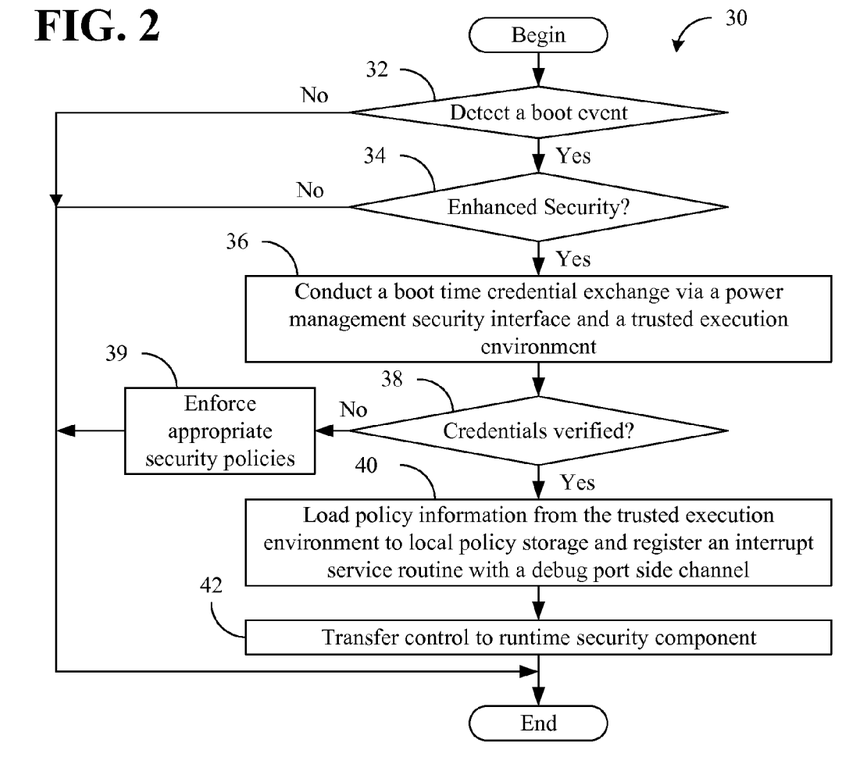
FIG. 2 is a flowchart of an example of a method of operating a security-enabled power management integrated circuit (PMIC) at boot time according to an embodiment.

FIG. 2 shows a method 30 of operating a PMIC at boot time. The method 30 may generally be implemented in a PMIC such as, for example, the security-enabled PMIC 16 (FIG. 1), already discussed. More particularly, the method 30 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 30 may be written in any combination of one or more programming languages, including an object oriented programming language such as JAVA, SMALLTALK, C++ or the like and conventional procedural programming languages, such as the "C" programming language or similar programming languages.

Illustrated processing block 32 provides for determining whether a boot event, for example, a power-on-self-test (POST) routine, reset request, and so forth, has been detected. If a boot event has been detected, processing block 34 may determine whether enhanced security is enabled. If so, illustrated processing block 36 conducts, in response to the boot event, a boot time credential exchange via a power management security interface (e.g, running on a host processor) and a trusted execution environment (TEE, e.g., a converged manageability security engine/CSME of INTEL Corporation, TRUSTZONE of ARM Holdings). The boot time credential exchange may involve the transfer of security credentials from the PMIC through the power management security interface to the trusted execution environment, which may in turn determine the authenticity of the PMIC (e.g., through challenge/response attestations). If either a boot event is not detected at processing block 32 or it is determined that enhanced security is not enabled at processing block 34, the illustrated method terminates.

If it is determined at processing block 38 that the boot time credential exchange is successful (e.g., the credentials of the PMIC are verified), illustrated processing block 40 loads policy information from the trusted execution environment to local policy storage. The policy information may include, for example, action identifiers (e.g., indicating what actions to take in order to enforce a security policy), credential data (e.g., TEE certification), power thresholds (e.g., rail noise thresholds, voltage swing thresholds), and so forth. Processing block 40 may also provide for registering an interrupt service routine (ISR) with a dedicated side channel of a debug port such as, for example, a Joint Test Access Group (JTAG) debug port. Illustrated processing block 42 transfers control to the runtime security component. If it is determined at block 38 that the boot time credential exchange is unsuccessful (e.g., the credentials of the PMIC are not verified), illustrated processing block 39 enforces appropriate security policies such as, for example, generating an alert, logging the unsuccessful exchange, or other action.

Figure 3:
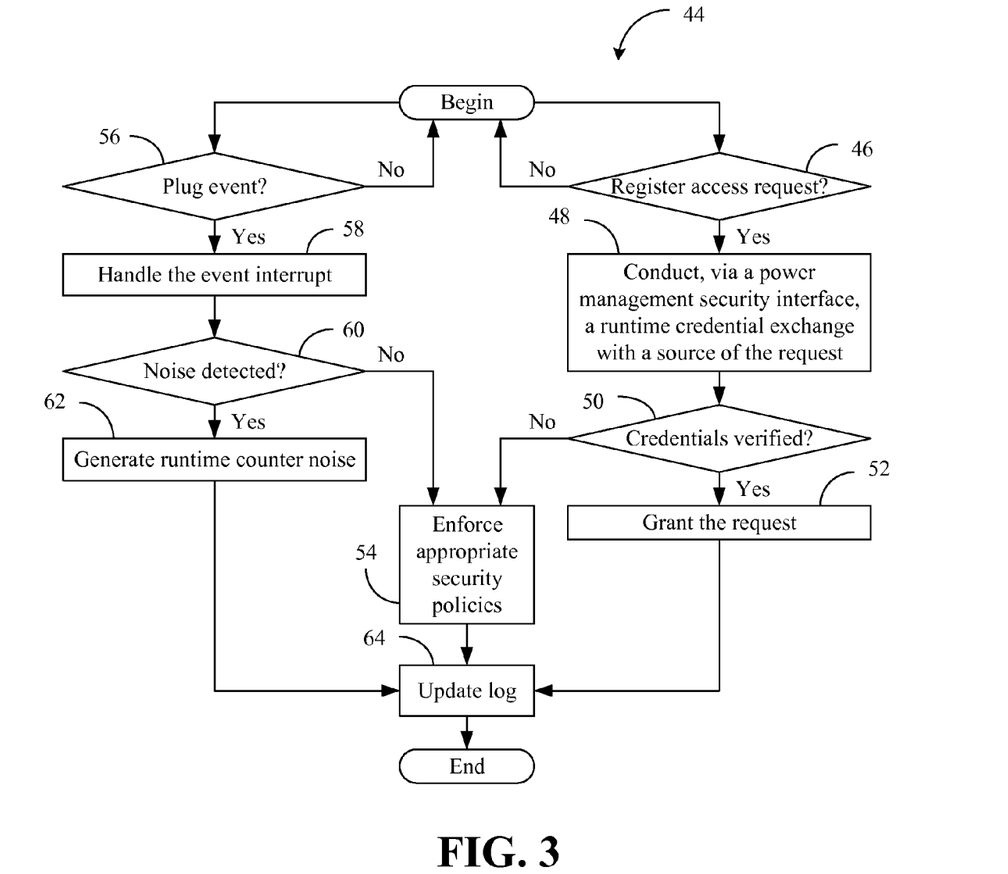
FIG. 3 is a flowchart an example of a method of operating a PMIC at runtime according to an embodiment.

FIG. 3 shows a method 44 of operating a PMIC at runtime. The method 44 may generally be implemented in a PMIC such as, for example, the security-enabled PMIC 16 (FIG. 1), already discussed. More particularly, the method 44 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 46 determines whether a request to access a power management register has been detected. The request may be received from an application (e.g., valid secure mode application instance/enclave, malware) running on, for example, a host processor, wherein the power management register may store power consumption information such as, for example, power state information (e.g., Advanced Configuration and Power Interface/ACPI state transition data), Device Power States (e.g. "D0ix") or Platform Power State ("s0ix"). A runtime credential exchange may be conducted, via a power management security interface, with a source of the request at processing block 48. The runtime credential exchange may involve the transfer of security credentials from the source/originator of the request through the power management security interface to the PMIC, which may in turn determine the authenticity of the originator (e.g., through challenge/response attestations).

If it is determined at processing block 50 that the runtime credential exchange is successful (e.g., the credentials of the source/originator are verified), illustrated processing block 52 may grant the request and provide access to the power management register in question. If, on the other hand, it is determined at processing block 50 that the runtime credential exchange is unsuccessful (e.g., the credentials of the source/originator are not verified), illustrated processing block 54 enforces appropriate security policies such as, for example, denying the request, generating an alert, or other action. Processing block 54 may involve retrieving policy information from local policy storage, wherein the policy information (e.g., previously loaded from the TEE at boot time) includes action identifiers, credential data, power thresholds, etc., or any combination thereof. Thus, the request might be denied based on the retrieved policy information.

Illustrated processing block 56 determines whether a plug event (e.g., JTAG hot plug/unplug event) has been detected, via a dedicated side channel (e.g., out-of-band interface), with respect to a debug port. If so, an interrupt associated with the plug event may be handled by an interrupt service routing (ISR, previously registered with the side channel) at processing block 58. Illustrated processing block 60 may conduct a noise analysis of one or more power rails in response to the plug event. The noise analysis may generally identify potential security attacks based on the electrical characteristics of the power rails. For example, processing block 60 may determine whether voltage fluctuations observed on a given power rail are within expected voltage thresholds. In this regard, the unauthorized monitoring of a voltage rail may involve an electrical connection that generates unexpected noise (e.g., outside the voltage/power thresholds) on the power rail.

If processing block 60 identifies a potential security attack (e.g., the observed voltage fluctuations are outside acceptable thresholds), illustrated processing block 62 generates policy based counter noise on at least one of the one or more power rails. The policy based counter noise may generally prevent security threats from obtaining a valid measurement from the power rails involved. If it is determined at processing block 60 that no potential security attack has been identified, illustrated processing block 54 enforces appropriate security policies (e.g., generating an alert), as already discussed. The attributes of the attempt (e.g., type of attempt, status, request source and/or attacker identity) may also be logged at processing block 64. The rightmost register portion and the leftmost power rail portion shown in the method 44 may be implemented in combination or independently of one another (e.g., the register portion may be implemented without the power rail portion or the power rail portion may be implemented without the register portion), depending on the circumstances.

Figure 4:
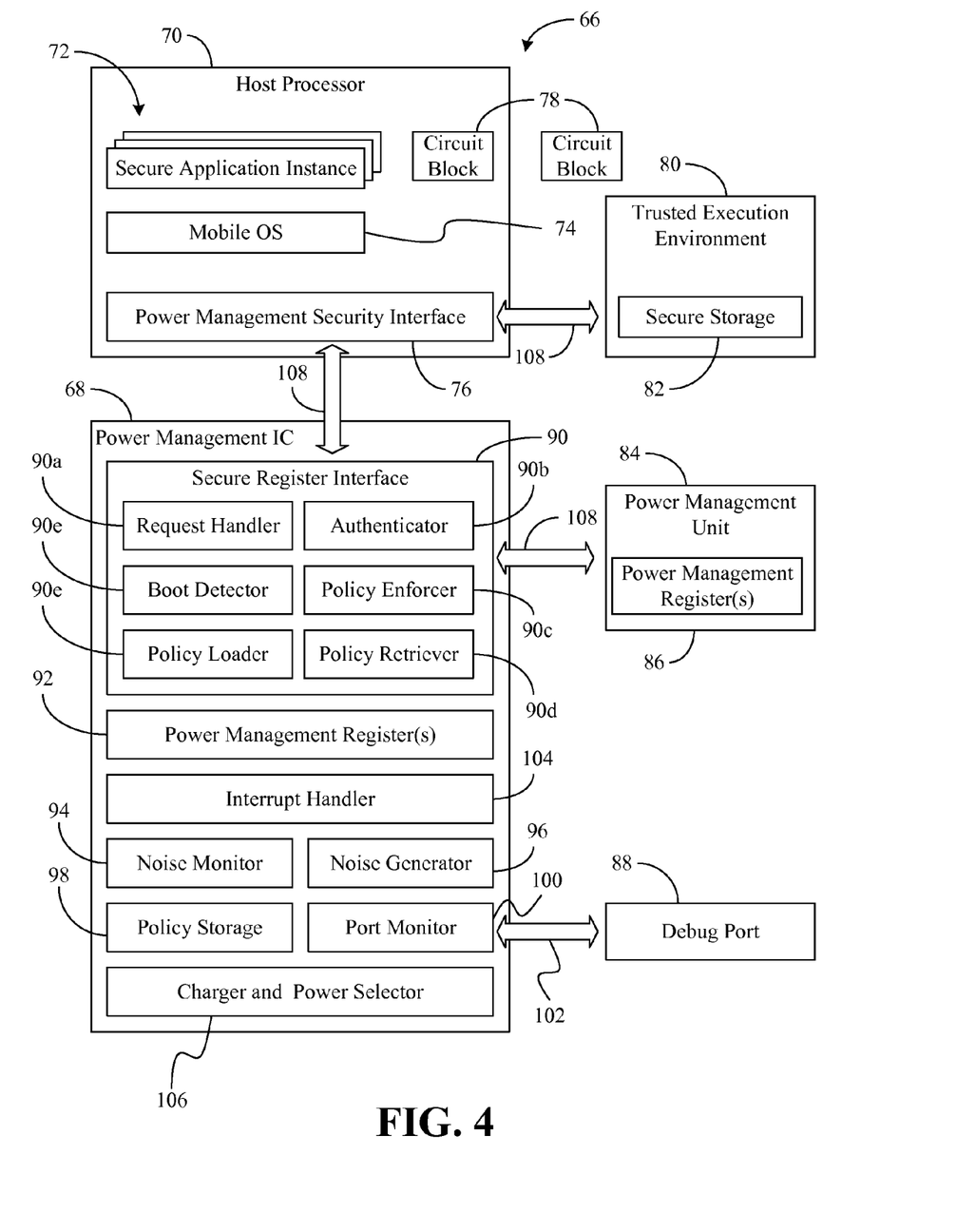
FIG. 4 is a block diagram of an example of a power management computing architecture according to an embodiment.

Turning now to FIG. 4, a power management computing architecture 66 is shown in which a power management integrated circuit (PMIC) 68 provides enhanced security. The PMIC 68 may generally implement one or more aspects of the method 30 (FIG. 2) and/or the method 44 (FIG. 3), already discussed. In the illustrated example, a host processor 70 includes one or more secure application instances 72 (e.g., security guard extension/SGX enclaves), a mobile operating system (OS) 74 and a power management security interface 76. One or more circuit blocks 78 may also be incorporated into the host processor 70 and/or elsewhere in the power management computing architecture 66. The architecture 66 may also include a trusted execution environment (TEE) 80 that includes secure storage 82, a power management unit (PMU) 84 that includes one or more power management registers 86, and a debug port 88 (e.g., JTAG port). The PMU 84 may use the power management registers 86 in communications that manage the power state transitions of the circuit blocks 78.

The illustrated PMIC 68 includes a secure register interface 90 (90a-90f) that generally restricts access to power management registers such as, for example, the power management registers 86 and/or one or more local power management registers 92. The PMIC 68 may also include a charger and power selector 106 that uses the local power management registers 92 to support the power state transitions managed by the PMU 84. The secure register interface 90 may have a request handler 90*a* to detect a request to access to one or more of the power management registers 86, 92, wherein the power management registers 86, 92 may include power consumption information associated with one or more circuit blocks. The source of the request may be, for example, one or more of the secure application instances 72, the mobile OS 74, malware (not shown), and so forth.

An authenticator 90*b* may conduct, via the power management security interface 76, a runtime credential exchange with the source of the request. In addition, a policy enforcer 90*c* may deny the request if the runtime credential exchange is unsuccessful. In this regard, a policy retriever 90*d* may retrieve policy information (e.g., action identifiers, credential data, power thresholds) from local policy storage 98, wherein the request may be denied based on the policy information. If the runtime credential exchange is successful, the policy enforcer 90*c* may alternatively grant the request (e.g., based on the policy information).

The illustrated PMIC 68 also includes a port monitor 100 to detect, via a dedicated side channel 102, a plug event (e.g., JTAG hot plug/unplug event) with respect to the debug port 88. The illustrated side channel 102 is dedicated to the port monitor 100 and may be considered a side channel to the extent that it does not carry primary debug signals. A noise monitor 94 may conduct a noise analysis of one or more power rails (not shown) in response to the plug event. Additionally, the illustrated PMIC 68 includes a noise generator 96 to generate policy based counter noise on at least one of the one or more power rails at runtime if the noise analysis identifies a potential security attack.

More particularly, the general technique of conducting a policy based counter attack may be to use real time noise cancellation techniques applied to power loading. A description of one example of such a counter attack approach is as follows:

1) Monitor power fluctuations (e.g., sinusoidal waves);
2) Apply a real-time Fourier transform to generate a sinusoidal wave that is the cosine of the sine wave such that it exactly opposes the power wave;
3) Input the cosine wave into a variable resistor that is powered by the same power source feeding the monitored power rails;
4) Drive the current over the power rails that simultaneously feed the circuit block and variable resistor so that the load over the power rail is constant.
5) Apply a backoff-retry logic to the system so that when circuit block power requirements are relatively low, the variable resistor compensation wave is lowered (e.g., over a period of time seconds or milliseconds) to prevent power consumption at full power for long periods.

The secure register interface 90 may also include a boot detector 90*e* to detect boot events, wherein the authenticator 90*b* may conduct, in response to the boot events, boot time credential exchanges via the power management security interface 76 and the trusted execution environment 80. A policy loader 90*f* may load policy information from the secure storage 82 of the trusted execution environment 80 to the local policy storage 98 if the boot time credential exchanges are successful. Thus, the trusted execution environment 80 may act as an arbitrator between the PMIC 68 and potential attackers, while maintaining, updating, and managing access to the policy information without concern over vulnerability to malware attacks. Indeed, the trusted execution environment 80 may make dynamic policy changes such as threshold updates (e.g., a 5% to 7% threshold adjustment), depending on the circumstances.

In addition, an interrupt handler 104 may register an interrupt service routine (ISR) with the dedicated side channel 102 if the boot time credential exchange is successful. Thus, links 108 between the trusted execution environment 80, the power management security interface 76, the secure register interface 90 and the power management unit 84, as well as the dedicated side channel 102, may be considered secure paths that are resistant to power management attacks. Additionally, the trusted execution environment 80 may schedule crypto operations including key generation operations, where a security relevant operation may be performed and an analog signature corresponding to the operation is supplied to the PMIC 68 to inform the noise generator 96 regarding a noise subtraction pattern that "cancels" the anticipated noise produced by the crypto operation.

Figure 5:
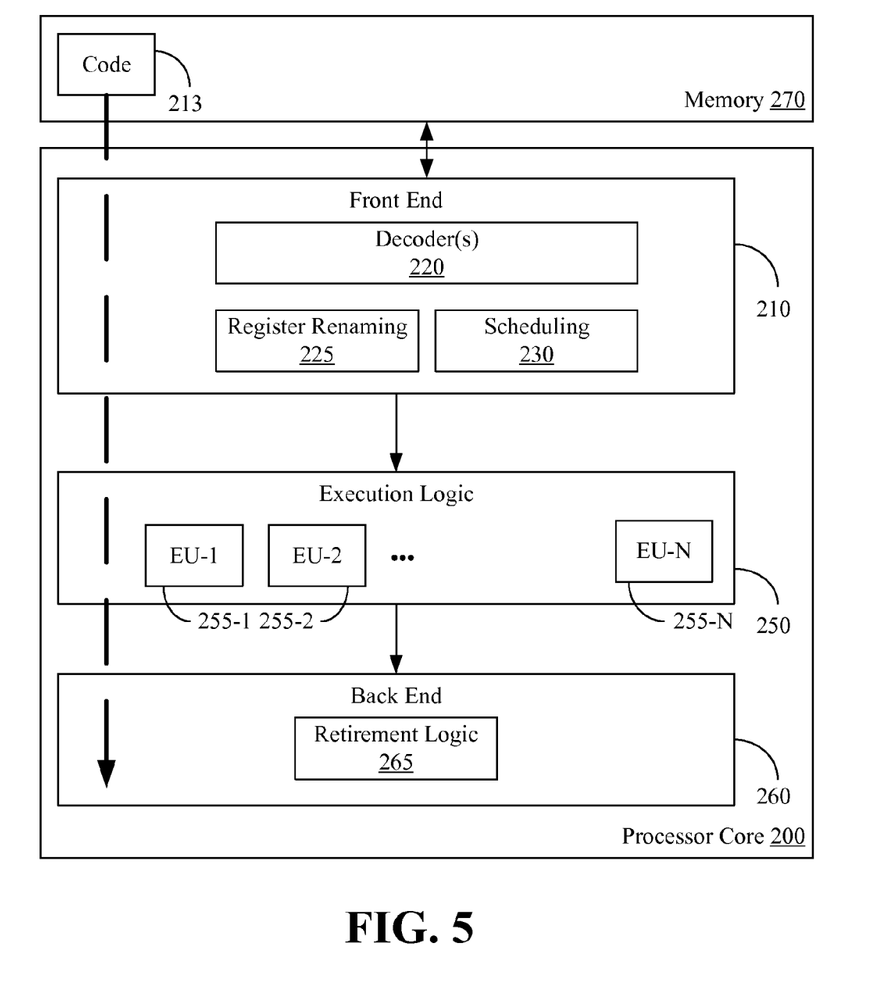
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30 (FIG. 2) and/or the method 44 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
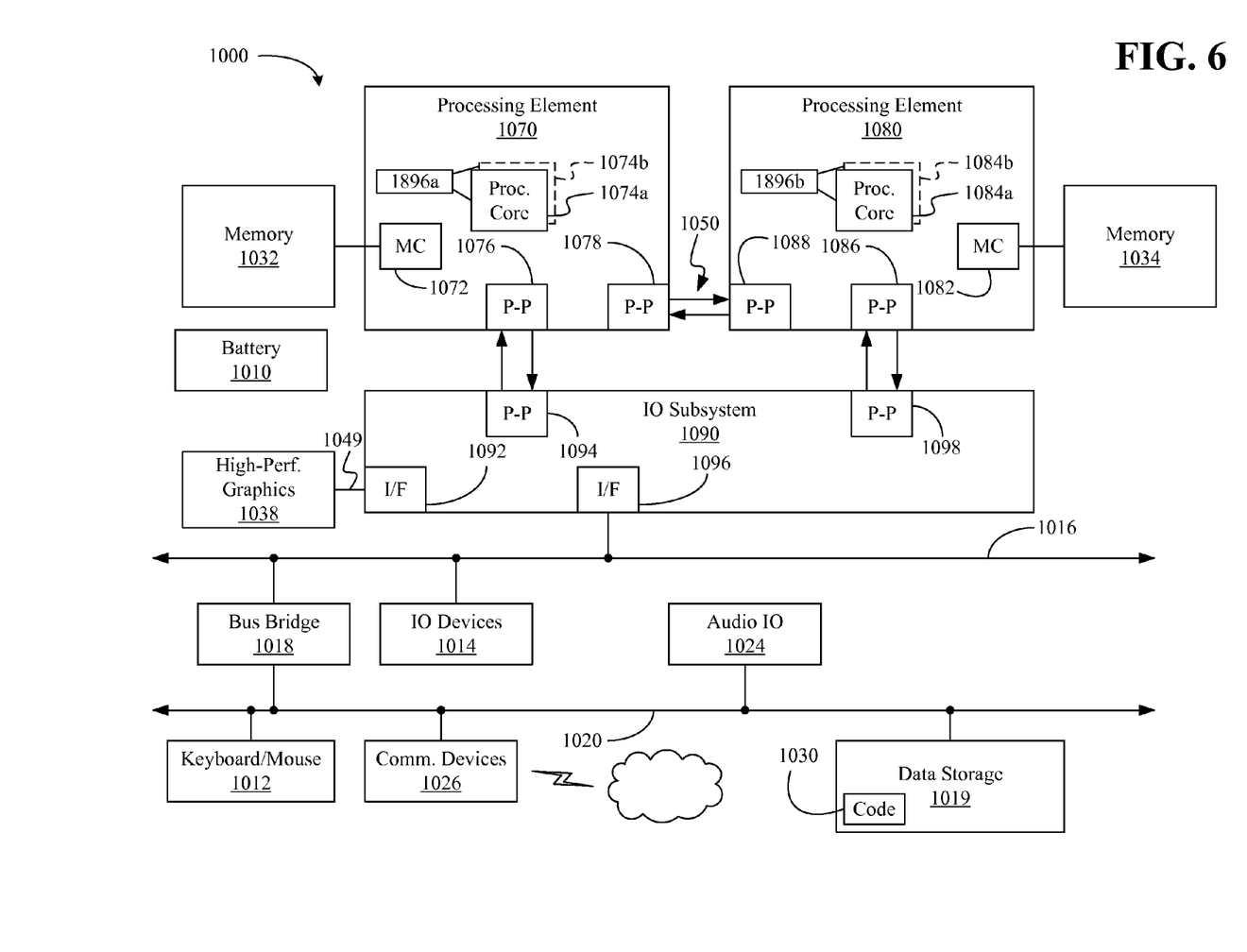
FIG. 6 is a block diagram of an example of a computing system according to an embodiment.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 30 (FIG. 2) and/or the method 44 (FIG. 3), already discussed, and may be similar to the code 213 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

ADDITIONAL NOTES AND EXAMPLES

Example 1 may include a system on chip (SoC) computing architecture comprising a power source to supply power to the SoC, a plurality of circuit blocks and a power management integrated circuit including a power management register associated with one or more of the plurality of circuit blocks, a request handler to detect a request to access the power management register, an authenticator to conduct, via a power management security interface, a runtime credential exchange with a source of the request, and a policy enforcer to deny the request if the runtime credential exchange is unsuccessful.

Example 2 may include the system on chip of Example 1, further including one or more power rails coupled to the power source and the plurality of circuit blocks, and a debug port, wherein the power management integrated circuit includes a port monitor to detect, via a dedicated side channel, a plug event with respect to the debug port, a noise monitor to conduct a noise analysis of the one or more power rails in response to the plug event, and a noise generator to generate policy based counter noise on at least one of the one or more power rails at runtime if the noise analysis identifies a potential security attack.

Example 3 may include the system on chip of Example 1, further including a trusted execution environment, wherein the power management integrated circuit includes a boot detector to detect a boot event, wherein the authenticator is to conduct, in response to the boot event, a boot time credential exchange via the power management security interface and the trusted execution environment, a policy loader to load policy information from the trusted execution environment to local policy storage if the boot time credential exchange is successful, and an interrupt handler to register an interrupt search routine with a dedicated side channel of a debug port if the boot time credential exchange is successful.

Example 4 may include the system on chip of Example 1, wherein the power management integrated circuit further includes a local policy storage, and a policy retriever to retrieve policy information from the local policy storage, wherein the request is to be denied based on the policy information and the policy information includes one or more of action identifiers, credential data or power thresholds.

Example 5 may include the system on chip of Example 1, wherein the policy enforcer is to grant the request if the runtime credential exchange is successful.

Example 6 may include the system on chip of any one of Examples 1 to 5, wherein the power management register is to include power consumption information.

Example 7 may include a power management apparatus comprising a request handler to detect a request to access a power management register, an authenticator to conduct, via a power management security interface, a runtime credential exchange with a source of the request, and a policy enforcer to deny the request if the runtime credential exchange is unsuccessful.

Example 8 may include the apparatus of Example 7, further including a port monitor to detect, via a dedicated side channel, a plug event with respect to a debug port, a noise monitor to conduct a noise analysis of one or more power rails in response to the plug event, a noise generator to generate policy based counter noise on at least one of the one or more power rails at runtime if the noise analysis identifies a potential security attack.

Example 9 may include the apparatus of Example 7, further including a boot detector to detect a boot event, wherein the authenticator is to conduct, in response to the boot event, a boot time credential exchange via the power management security interface and a trusted execution environment, a policy loader to load policy information from the trusted execution environment to local policy storage if the boot time credential exchange is successful, and an interrupt handler to register an interrupt service routine with a dedicated side channel of a debug port if the boot time credential exchange is successful.

Example 10 may include the apparatus of Example 7, further including a policy retriever to retrieve policy information from local policy storage, wherein the request is to be denied based on the policy information and the policy information includes one or more of action identifiers, credential data or power thresholds.

Example 11 may include the apparatus of Example 7, wherein the policy enforcer is to grant the request if the runtime credential exchange is successful.

Example 12 may include the apparatus of any one of Examples 7 to 11, wherein the power management register is to include power consumption information.

Example 13 may include a method of operating a power management integrated circuit, comprising detecting a request to access a power management register, conducting, via a power management security interface, a runtime credential exchange with a source of the request, and denying the request if the runtime credential exchange is unsuccessful.

Example 14 may include the method of Example 13, further including detecting, via a dedicated side channel, a plug event with respect to a debug port, conducting a noise analysis of one or more power rails in response to the plug event, and generating policy based counter noise on at least one of the one or more power rails at runtime if the noise analysis identifies a potential security attack.

Example 15 may include the method of Example 13, further including detecting a boot event, conducting, in response to the boot event, a boot time credential exchange via the power management security interface and a trusted execution environment, loading policy information from the trusted execution environment to local policy storage if the boot time credential exchange is successful, and registering an interrupt service routine with a dedicated side channel of a debug port if the boot time credential exchange is successful.

Example 16 may include the method of Example 13, further including retrieving policy information from local policy storage, wherein the request is denied based on the policy information and the policy information includes one or more of action identifiers, credential data or power thresholds.

Example 17 may include the method of Example 13, further including granting the request of the runtime credential exchange is successful.

Example 18 may include the method of any one of Examples 13 to 17, wherein the power management register includes power consumption information.

Example 19 may include at least one computer readable storage medium comprising a set of instructions, which when executed by a computing system, cause the computing system to detect a request to access a power management register, conduct, via a power management security interface, a runtime credential exchange with a source of the request, and deny the request if the runtime credential exchange is unsuccessful.

Example 20 may include the at least one computer readable storage medium of Example 19, wherein the instructions, when executed, cause a computing system to detect, via a dedicated side channel, a plug event with respect to a debug port, conduct a noise analysis of one or more power rails in response to the plug event, and generate policy based counter noise on at least one of the one or more power rails at runtime if the noise analysis identifies a potential security attack.

Example 21 may include the at least one computer readable storage medium of Example 19, wherein the instructions, when executed, cause a computing system to detect a boot event, conduct, in response to the boot event, a boot time credential exchange via the power management security interface and a trusted execution environment, load policy information from the trusted execution environment to local policy storage if the boot time credential exchange is successful, and register an interrupt service routine with a dedicated side channel of a debug port if the boot time credential exchange is successful.

Example 22 may include the at least one computer readable storage medium of Example 19, wherein the instructions, when executed, cause a computing system to retrieve policy information from local policy storage, and wherein the request is to be denied based on the policy information and the policy information includes one or more of action identifiers, credential data or power thresholds.

Example 23 may include the at least one computer readable storage medium of Example 19, wherein the instructions, when executed, cause a computing system to grant the request if the runtime credential exchange is successful.

Example 24 may include the at least one computer readable storage medium of any one of Examples 19 to 23, wherein the power management register is to include power consumption information.

Example 25 may include a security-enhanced power management apparatus comprising means for detecting a request to access a power management register, means for conducting, via a power management security interface, a runtime credential exchange with a source of the request, and means for denying the request if the runtime credential exchange is unsuccessful.

Example 26 may include the apparatus of Example 25, further including: means for detecting, via a dedicated side channel, a plug event with respect to a debug port, means for conducting a noise analysis of one or more power rails in response to the plug event, and means for generating policy based counter noise on at least one of the one or more power rails at runtime if the noise analysis identifies a potential security attack.

Example 27 may include the apparatus of Example 25, further including means for detecting a boot event, means for conducting, in response to the boot event, a boot time credential exchange via the power management security interface and a trusted execution environment, means for loading policy information from the trusted execution environment to local policy storage if the boot time credential exchange is successful, and means for registering an interrupt service routine with a dedicated side channel of a debug port if the boot time credential exchange is successful.

Example 28 may include the apparatus of Example 25, further including means for retrieving policy information from local policy storage, wherein the request is to be denied based on the policy information and the policy information includes one or more of action identifiers, credential data or power thresholds.

Example 29 may include the apparatus of Example 25, further including means for granting the request of the runtime credential exchange is successful.

Example 30 may include the apparatus of any one of Examples 25 to 29, wherein the power management register is to include power consumption information.

Thus, techniques described herein may expose power management registers via a secure power management security interface so that only trusted authorized agents are able to manage and monitor power in a computing system. Moreover, JTAG hot plug/unplug events may be detected via a secure out-of-band dedicated channel. Power management integrated circuits may be provisioned by a trusted execution environment with expected power thresholds, wherein the power management integrated circuits may use the provisioned power thresholds to enforce policy based actions. In one example, power management integrated circuits include a noise monitor/detector and a noise generator to detect any side channel attacks and introduce runtime scramble/fuzz noise appropriately.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a power source to supply power to the system; a plurality of circuit blocks;
one or more power rails coupled to the power source and the plurality of circuit blocks;
a debug port; and
a power management integrated circuit including:
a power management register associated with one or more of the plurality of circuit blocks,
a request handler to detect a request to access the power management register,
an authenticator to conduct, via a power management security interface, a runtime credential exchange with a source of the request,
a policy enforcer to deny the request if the runtime credential exchange is unsuccessful,
a port monitor to detect, via a dedicated side channel, a plug event with respect to the debug port,
a noise monitor to conduct a noise analysis of the one or more power rails in response to the plug event, and
a noise generator to generate policy based counter noise on at least one of the one or more power rails at runtime if the noise analysis identifies a potential security attack.

2. The system of claim 1, further including a trusted execution environment, wherein the power management integrated circuit includes:
a boot detector to detect a boot event, wherein the authenticator is to conduct, in response to the boot event, a boot time credential exchange via the power management security interface and the trusted execution environment,
a policy loader to load policy information from the trusted execution environment to local policy storage if the boot time credential exchange is successful, and
an interrupt handler to register an interrupt search routine with the dedicated side channel of the debug port if the boot time credential exchange is successful.

3. The system of claim 1, wherein the power management integrated circuit further includes:
a local policy storage, and
a policy retriever to retrieve policy information from the local policy storage, wherein the request is to be denied based on the policy information and the policy information includes one or more of action identifiers, credential data or power thresholds.

4. The system of claim 1, wherein the policy enforcer is to grant the request if the runtime credential exchange is successful.

5. The system of claim 1, wherein the power management register is to include power consumption information.

6. An apparatus comprising:
an integrated circuit comprising:
a request handler to detect a request to access a power management register;
an authenticator to conduct, via a power management security interface, a runtime credential exchange with a source of the request;
a policy enforcer to deny the request if the runtime credential exchange is unsuccessful;
a port monitor to detect, via a dedicated side channel, a plug event with respect to a debug port;
a noise monitor to conduct a noise analysis of one or more power rails in response to the plug event; and a noise generator to generate policy based counter noise on at least one of the one or more power rails at runtime if the noise analysis identifies a potential security attack.

7. The apparatus of claim 6, further including:
a boot detector to detect a boot event, wherein the authenticator is to conduct, in response to the boot event, a boot time credential exchange via the power management security interface and a trusted execution environment;
a policy loader to load policy information from the trusted execution environment to local policy storage if the boot time credential exchange is successful; and
an interrupt handler to register an interrupt service routine with the dedicated side channel of the debug port if the boot time credential exchange is successful.

8. The apparatus of claim 6, further including a policy retriever to retrieve policy information from local policy storage, wherein the request is to be denied based on the policy information and the policy information includes one or more of action identifiers, credential data or power thresholds.

9. The apparatus of claim 6, wherein the policy enforcer is to grant the request if the runtime credential exchange is successful.

10. The apparatus of claim 6, wherein the power management register is to include power consumption information.

11. A method comprising:
detecting a request to access a power management register;
conducting, via a power management security interface, a runtime credential exchange with a source of the request;
denying the request if the runtime credential exchange is unsuccessful;
detecting, via a dedicated side channel, a plug event with respect to a debug port;
conducting a noise analysis of one or more power rails in response to the plug event; and
generating policy based counter noise on at least one of the one or more power rails at runtime if the noise analysis identifies a potential security attack.

12. The method of claim 11, further including:
detecting a boot event;
conducting, in response to the boot event, a boot time credential exchange via the power management security interface and a trusted execution environment;
loading policy information from the trusted execution environment to local policy storage if the boot time credential exchange is successful; and
registering an interrupt service routine with the dedicated side channel of the debug port if the boot time credential exchange is successful.

13. The method of claim 11, further including retrieving policy information from local policy storage, wherein the request is denied based on the policy information and the policy information includes one or more of action identifiers, credential data or power thresholds.

14. The method of claim 11, further including granting the request of the runtime credential exchange is successful.

15. The method of claim 11, wherein the power management register includes power consumption information.

16. At least one non-transitory computer readable storage medium comprising a set of instructions, which when executed by a computing system, cause the computing system to:

detect a request to access a power management register;

conduct, via a power management security interface, a runtime credential exchange with a source of the request;

deny the request if the runtime credential exchange is unsuccessful;

detect, via a dedicated side channel, a plug event with respect to a debug port;

conduct a noise analysis of one or more power rails in response to the plug event;

and generate policy based counter noise on at least one of the one or more power rails at runtime if the noise analysis identifies a potential security attack.

17. The at least one non-transitory computer readable storage medium of claim 16, wherein the instructions, when executed, cause a computing system to:

detect a boot event;

conduct, in response to the boot event, a boot time credential exchange via the power management security interface and a trusted execution environment;

load policy information from the trusted execution environment to local policy storage if the boot time credential exchange is successful; and register an interrupt service routine with the dedicated side channel of the debug port if the boot time credential exchange is successful.

18. The at least one non-transitory computer readable storage medium of claim 16, wherein the instructions, when executed, cause a computing system to retrieve policy information from local policy storage, and wherein the request is to be denied based on the policy information and the policy information includes one or more of action identifiers, credential data or power thresholds.

19. The at least one non-transitory computer readable storage medium of claim 16, wherein the instructions, when executed, cause a computing system to grant the request if the runtime credential exchange is successful.

20. The at least one non-transitory computer readable storage medium of claim 16, wherein the power management register is to include power consumption information.

* * * * *